UNITED STATES PATENT OFFICE.

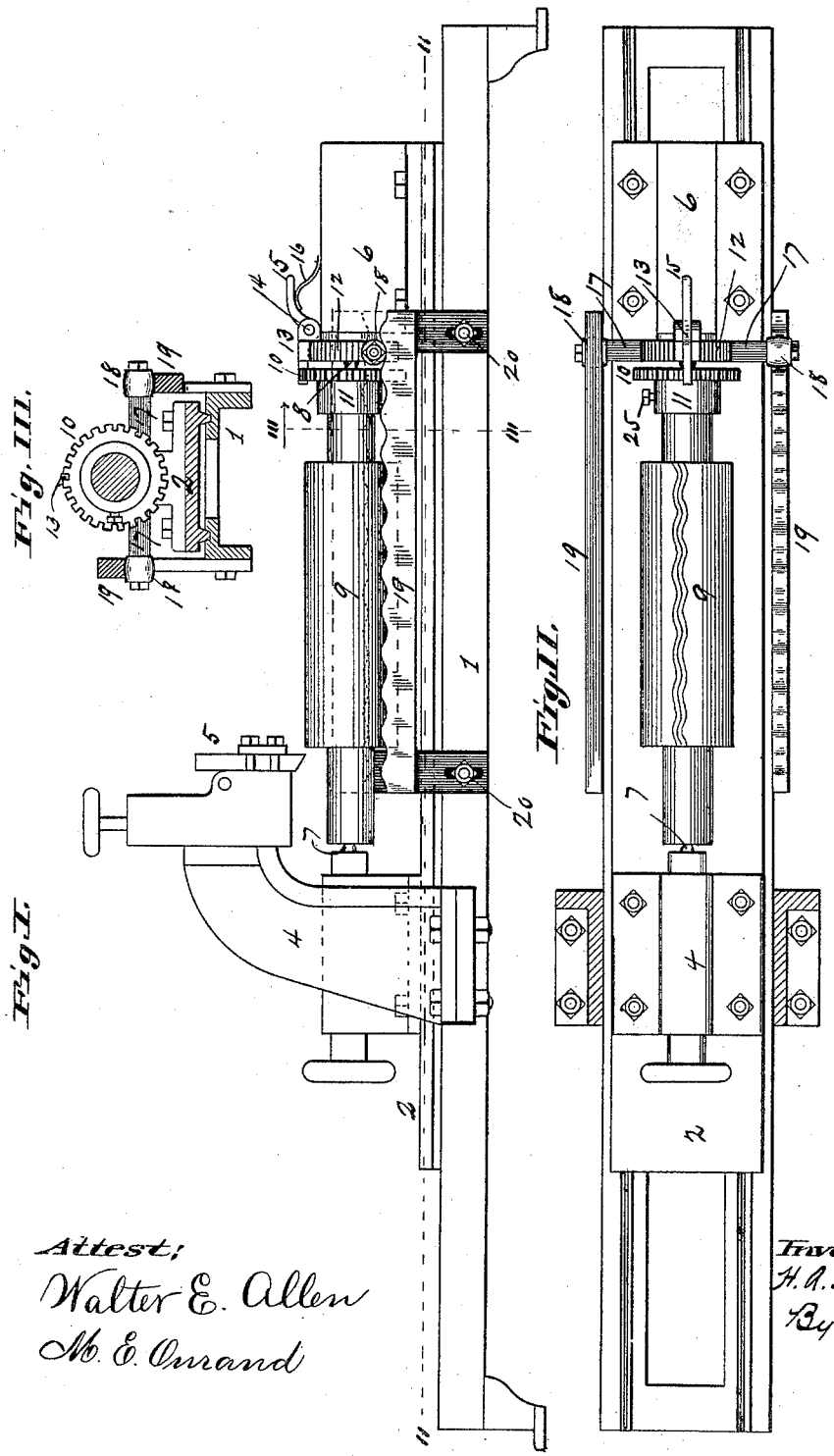

HENRY A. HUEFFNER, OF PALMER, ILLINOIS.

CORRUGATING-MACHINE.

SPECIFICATION forming part of Letters Patent No. 464,875, dated December 8, 1891.

Application filed July 27, 1891. Serial No. 400,871. (No model.)

*To all whom it may concern:*

Be it known that I, HENRY A. HUEFFNER, of Palmer, in the county of Christian and State of Illinois, have invented a certain new and useful Improvement in Corrugating-Machines, of which the following is a full, clear, and exact description, reference being had to the accompanying drawings, forming part of this specification.

My invention relates to a simple and effective machine for corrugating rolls for use in the production of flour, &c.; and my invention consists in features of novelty hereinafter fully described, and pointed out in the claims.

Figure I is a side elevation illustrative of my invention. Fig. II is a longitudinal section taken on line II II, Fig. I; and Fig. III is a vertical transverse section taken on line III III, Fig. I.

Referring to the drawings, 1 represents the body or shear of the machine; 2, the bed-plate or table; 4, the head-stock holding the tool 5, and 6 the tail-stock. There is nothing new about any of these parts thus far enumerated, and they may be constructed on any well-known principle of a planer, the head-stock having a center 7 and the tail-stock a center 8, between which the roll 9 to be corrugated is held.

10 represents a notched disk provided with a hub 11 and which fits over and is secured to the journal of the roll next the tail-stock.

12 represents a disk fitting on the center 8 or other projection of the tail-stock and upon which it is free to turn. This disk is also preferably provided with notches.

13 represents a dog pivoted to the disk 12 at 14 and having an extended end 15, by which it may be moved and against which a spring 16, secured to the tail-stock, presses to hold the inner end of the dog into engagement with the teeth or notches of the disk 10, and thus the disk 10 is connected to the disk 12, so as to be turned with and by the latter, while the dog permits of an adjustment of the disk 10 and the roller 9 relatively to the position of the disk 12.

The disk 12 has side extensions 17, preferably provided with friction-rollers 18, which bear against bars or strips 19, having slot-and-bolt connection 20 with the body of the machine. The bar 19 on one side of the machine is beneath its roller 18 and on the other side of the machine is above the roller 18, as shown clearly in Fig. III.

If a serpentine corrugation such as is shown in my patent, No. 386,014, dated July 10, 1888, is desired, the bars 19 would be corrugated, as shown in Fig. I, so that as the rollers 18 move along the bars they will rock the disk 12, and the motion will be transmitted through the dog 13 and disk 10 to the roller 9, so that the tool will cut a serpentine corrugation as the roller moves longitudinally beneath it.

If a spiral corrugation is wanted, one end of one of the bars 19 is raised and the corresponding end of the other bar 19 lowered a like amount, so that as the rollers 18 travel along the bars 19 they will turn the rollers 9 slightly and thus produce the diagonal corrugation, and thus by adjustably connecting the bars 19 to the body of the machine they can be adjusted at will to suit the operator and produce the amount of diagonal cut desired, and by dressing the surfaces of the bars against which the rollers 18 bear any desired configuration is given to the corrugation on the roller.

When a corrugation is made along the roller the dog 13 is raised out of engagement with the disk 10 and the roller 9 and disk 10 turned until the dog engages the next notch, and if an intermediate corrugation is to be made it can be done by shifting the disk 10 on the journal of the roller and tightening it again by means of the set-screw 25, the amount of the shift being less than the distance of one tooth or notch of the disk, so that by shifting the disk slightly on the journal and allowing the dog to occupy the same notch in the disk any desired distance between the corrugations may be effected.

It is evident that both of the bars 19 might be placed on one side of the machine, one over and the other beneath the roller 18, and thus one of the arms 17 and its roller 18 be dispensed with.

I claim as my invention—

1. In a machine for corrugating rolls, in combination with a suitable mechanism for supporting and moving the roll and supporting a tool, a vertically-adjustable bar 19, and a connection between the roller and the bar, said bar being formed with a surface corresponding to the corrugations to be formed, substantially as set forth.

2. In a machine for corrugating rolls, in combination with a mechanism for supporting and moving the roll and supporting a tool, a movable disk having a lateral arm and connected to the roll, and a bar against which the arm of the disk bears and which has a bearing-surface corresponding to the form of corrugations to be produced, substantially as and for the purpose set forth.

3. In a machine for corrugating rolls, in combination with a mechanism for supporting and moving the roll and supporting a tool, a disk 12, having lateral arms provided with friction-rollers, a disk 10, having notches or teeth, a dog on the first-mentioned disk engaging the notches or teeth of the disk 10, and bars 19, having surfaces corresponding to the corrugations to be produced, substantially as and for the purpose set forth.

4. In a machine for corrugating rolls, the combination of a mechanism for supporting and moving a roll and supporting a tool, a disk 12, having lateral extensions 17 and rollers 18, a disk 10, having notches or teeth, a dog pivoted to the disk 12 and engaging the teeth of the disk 10, and adjustable bars 19, substantially as and for the purpose set forth.

HENRY A. HUEFFNER.

In presence of—
LOUIS FREDERICK,
F. C. BEST.